United States Patent Office 3,297,749
Patented Jan. 10, 1967

3,297,749
PROCESS FOR THE PRODUCTION OF
SUBSTITUTED BORAZOLES
Elmar-Manfred Horn and Konrad Lang, both of Leverkusen, Germany, assignors to Farbenfabriken Bayer Aktiengesellschaft, Leverkusen, Germany, a German corporation
No Drawing. Filed Apr. 24, 1962, Ser. No. 189,705
Claims priority, application Germany, Apr. 29, 1961, F 33,818
5 Claims. (Cl. 260—551)

This invention relates to a process for the production of compounds comprising boron and nitrogen and especially is concerned with a process of preparing organically substituted borazoles.

More particularly the invention relates to a new and improved process of producing borazoles represented by the general formula

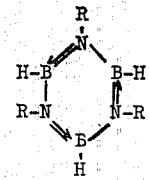

where R represents a member of the group consisting of aliphatic hydrocarbon radicals, cycloaliphatic hydrocarbon radicals, aromatic hydrocarbon radicals, substituted aromatic hydrocarbon racials and aralkyl hydrocarbon radicals. The borazoles are useful as intermediate products, for example in the production of boron-containing high polymers which exhibit neutron-absorbing properties, and are employed as additives to propellants and lubricants.

The previous methods for preparation of N,N′,N″-trisubstituted borazoles require starting materials sensitive to air and moisture, such as, for example, boron trichloride and lithium alanate, or can be carried out only in certain expensive solvents, such as, for example, dialkyl ethers of polyethylene glycols. Thus, for example, U.S. patent specification No. 2,945,882 describes the reaction of N,N′,N″-triphenyl-B,B′,B″-trichloroborazole with the extremely moisture-sensitive lithium alanate, whilst, according to Jour. Am. Chem. Soc. 76, 3303 (1954), the reaction of B,B′,B″-trichloroborazole with lithium borohydride takes place with the formation of 0.5 mol of diborane per mol of lithium borohydride

Diborane is not only very poisonous, but frequently self-ignites when exposed to the air. The reaction of the N,N′,N″-trisubstituted B,B′,B″-trichloroborazoles with sodium borohydride in dimethyl ethers of tri- and diethylene glycol takes place, according to Jour. Am. Chem. Soc. 82, 89 (1960), also in analogy to Equation 1, i.e., with splitting off of diborane. N,N′,N″-trialkylborazoles can be prepared in diethyl ether, according to Jour. Am. Chem. Soc. 77, 864 (1955), by the reaction of monoalkyl ammonium halides with lithium borohydride, for example according to

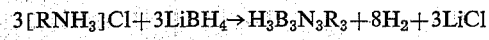

but this method requires, apart from high temperatures, lithium borohydride which is difficult to handle on addition to diethyl ether, and only 25% of the hydride hydrogen present in the borohydride are recovered as N,N′,N″-trialkyl-B,B′,B″-trihydrogen borazole, the remainder escaping as gaseous hydrogen.

Briefly described, the process of the present invention comprises effecting reaction between (1) a boron compound represented by the general formula

wherein R′ represents a member of the group consisting of aliphatic hydrocarbon radicals, cycloaliphatic hydrocarbon radicals and aromatic hydrocarbon radicals, and (2) a primary amine represented by the formula $$NH_2-R \qquad II$$

where R is a member of the group consisting of an aliphatic hydrocarbon radical up to 18 carbon atoms, a cycloaliphatic hydrocarbon radical, an aromatic hydrocarbon radical, a substituted aromatic hydrocarbon radical and an aralkyl hydrocarbon radical. In order to obtain a maximum yield of the N-substituted borazole, the boron compound of Formula I and the primary amine (Formula II) are employed in a molar ratio of 1 mol of the former to 1 mol of the latter and at temperature at which 2 mols of hydrogen are split off per mol amine; preferably in a temperature range of +40° C. to 130° C. The reaction may be effected in an inert liquid medium and in a protecting gas at atmosphere. It is carried out under anhydrous conditions.

In the case using aniline as primary amine (Formula II), on the one hand, and of triethyl amine borane on the other hand, the process according to the invention can be described by the following equation $$3(C_2H_5)_3N \cdot BH_3 + 3C_6H_5NH_2 \rightarrow$$
$$3(C_2H_5)_3N + H_3B_3N_3(C_6H_5)_3 + 6H_2$$

It has been further shown that the amine boranes serving as starting materials must not be used as such, but can be prepared in situ according to the Belgian patent specification No. 571,241 by the reaction of amine, borohydride and boron halide. Primary amine boranes are preferably used for this purpose which bear the same substituent as the borazole to be prepared so that the preparation of N,N′,N″-trisubstituted borazoles can start directly from borohydrides, boron halide, preferably in the form on an etherate, and primary aliphatic, cycloaliphatic or aromatic amines. In the case of the boron trifluoride-tetrahydrofuran addition compound the method according to the invention can be formulated, for example, as follows:

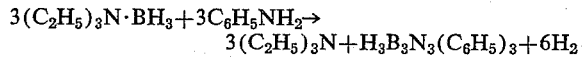

(THF=tetrahydrofuran)

thus no splitting off of diborane takes place in this case. Instread of using primary aliphatic, cycloaliphatic or aromatic amines and boron trihalides, for example, boron trifluoride-tetrahydrofuran addition compounds, the addition compounds of boron trifluoride and primary amines can be employed directly, as described, for example in equation

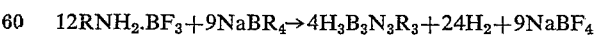

These amplifications of the process according to the invention make it possible to widen the range of the usable amines by the group of low boiling amines.

As examples for the amines usable in the process according to the invention, there may be mentioned: aliphatic amines, such as methylamine, ethylamine, n-propylamine, i-propylamine, butylamine, octylamine, dodecylamine, hexadecylamine, stearlyamine; cycloaliphatic amines, such as cyclohexylamine and nuclearly substituted cyclohexylamines; aromatic amines, such as aniline, mono- and polyalkyl-substituted anilines, such as toluidines and xylidines; mono- and polyalkoxy-substituted anilines, such as ansidines and phenetidines; aryl-substituted anilines such as 2-phenyl-aniline; nuclearly substituted anilines, such as mono- and polyhalogen substituted aniline, naphthylamines and nuclearly substituted naphthylamines.

The usable boron halides possess the general formula $BX_3$ in which X stands for F, Cl, Br or I. The addition compounds of the boron halides, such as for example boron trifluoride diethyl ether or boron trifluoride tetrahydrofuran may likewise be used as starting materials in the method according to the invention.

For economic reasons, alkali metal borohydrides, especially sodium borohydride, are preferably used, but other borohydrides such as potassium, lithium or calcium borohydride are also accessible to the reaction.

The use of solvents or suspending agents, for example ethers, such as tetrahydrofuran, or hydrocarbons, is advantageous but not necessary, since other solvents or suspending agents which are inert towards the reaction components can also be employed.

The process according to the invention is carried out above the decomposition temperatures of the primary amine boranes and below the decomposition temperatures of the N,N',N''-triorganosubstituted borazoles. The decomposition temperatures of primary amine boranes are described and the thermal stability of the N,N',N''-triorganosubstituted borazoles is sufficiently known from the chemical literature.

The reaction according to the invention is surprising since it is well known that the decomposition of primary amine boranes leads to N-monosubstituted aminoboranes which are converted into the corresponding borazoles at very high temperatures only whereby, in some cases, pressure must be used in order to prevent the dissociation of the reaction components. In contradistinction, the reaction according to the invention takes place at a little above the transformation point of the amine boranes into aminoboranes at a great speed. Therefore, a technical progress has been achieved since borazoles sensitive to temperature have been made accessible by the process according to the invention.

The following examples are given for the purpose of illustrating the invention.

*Example 1*

$3(C_2H_5)_3N.BH_3 + 3C_6H_{11}NH_2$
$\rightarrow H_3B_3N_3(C_6H_{11})_3 + 3(C_2H_5)_3N + 6H_2$ 115 g. of triethylamine borane (=1 mol) are placed in a 1 litre round-bottomed flask provided with stirrer, immersed thermometer, dropping funnel and descending condenser and heated whilst stirring in a protecting gas atmosphere to 120° C. At this temperature 99 g. of cyclohexylamine (=1 mol) are slowly added dropwise and the triethylamine is distilled off within 1.5 hours at an inside temperature of 100 to 120° C. After cooling the residue, N,N',N''-tricyclohexyl-B,B',B''-trihydrogenborazole is obtained as a solid white substance in 88% yield which after drying under vacuum shows a melting point of 98° C.

*Example 2*

$3(C_2H_5)_3N.BH_3 + 3C_{12}H_{25}NH_2$
$\rightarrow H_3B_3N_3(C_{12}H_{25})_3 + 3N(C_2H_5)_3 + 6H_2$ 185 g. of dodecylamine (=1 mol) are placed in the apparatus described above and melted. 115 g. of triethylamine borane (=1 mol) are added dropwise at a sump temperature of 130° C. within 1.5 hours and the freed triethylamine is distilled off at inside temperatures of up to 150° C. After removing the remaining triethylamine under vacuum N,N',N''-tridodecyl-B,B',B''-trihydrogenborazole is obtained as residue in form of a pale-yellow coloured viscous liquid in 93.5% yield. The analysis showed 5.24% B (theoretically 5.54% B) and 6.77% N (theoretically 7.17% N).

*Example 3*

$12\ n\text{—}C_3H_7NH_2 + 12BF_3.THF + 9NaBH_4$
$\rightarrow 4H_3B_3N_3(n\text{—}C_3H_7)_3 + 9NaBF_4 + 24H_2 + 12THF$ 205 g. of finely powdered sodium borohydride (=5.4 mols) are suspended in 1.87 l. of dry tetrahydrofuran, and 354 g. (=6 mols) of anhydrous n-propylamine are added. 840 g. (=6 mols) of boron trifluoride-tetrahydrofuran addition compound are slowly added dropwise with stirring, whereby with evolution of hydrogen, the reaction temperature rises to 50–65° C. Subsequently, the mixture is heated for 2 hours under reflux, cooled, filtered, the residue after filtration is washed several times with dry tetrahydrofuran and the solvent distilled off under normal pressure. After fractional distillation under vacuum N,N',N''-tri(n-propyl)-B,B',B''-trihydrogen borazole is obtained, as a colorless liquid in 82% yield in addition to polymeric borazoles.

*Analysis.*—Found: 51.58% C; 11.52% H; 19.3% N; 15.2% B; 1.35% active hydrogen. Theoretically: 52.1% C; 11.6% H; 20.3% N; 15.7% B; 1.45% active hydrogen.

*Example 4*

$12C_6H_5NH_2.BF_3 + 9NaBH_4 \rightarrow$
$4H_3B_3N_3(C_6H_5)_3 + 9NaBF_4 + 24H_2$ 142 g. (=3.6 mol) of sodium borohydride are suspended in 1.3 l. of dry tetrahydrofuran and 644 g. of aniline boron trifluoride addition compound (=4 mols) are added slowly whilst stirring so that the inside temperature does not exceed about 40° C. Subsequently, the mixture is boiled under reflux for 3 hours, cooled, sodium tetrafluoroborate and the excess of sodium borohydride are filtered off, the filter residue washed several times with tetrahydrofuran and the suspending agent is distilled off under normal pressure. After drying under vacuum, N,N',N_2'-triphenyl-B,B',B''-trihydrogen borazole is obtained from the residue in 87.5% yield which after recrystallization from hexane-chloroform (1:1) shows a melting point of 158° C.

*Example 5*

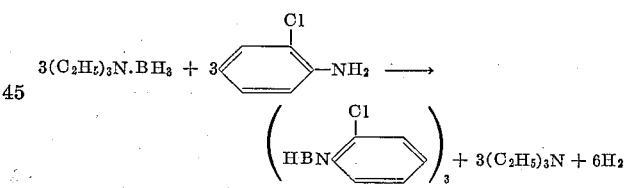

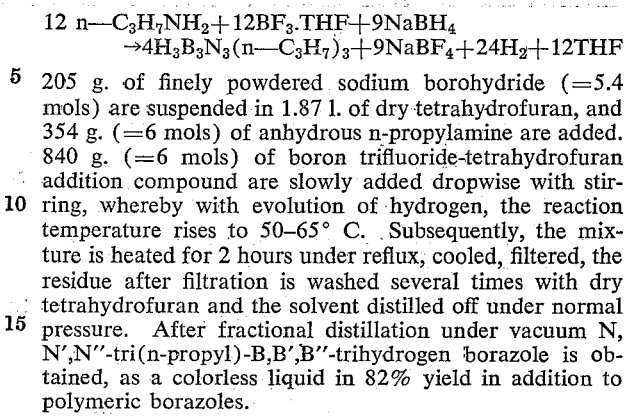

460 g. (=4 mols) of N-triethylborazane which were heated to 140° C. with stirring in an argon atmosphere are introduced into the apparatus described in Example 1. 510 g. (=4 mols) of 2-chloroaniline are added dropwise within 2 hours while distilling off the triethylamine formed. The contents of the flask is then heated for a short time to about 185° C., allowed to cool, triethylamine residues and the non-reacted starting products are removed in a vacuum. White, crystalline N,N',N''-tri-(2-chlorophenyl)-B,B',B'' - trihydrogen - borazole is obtained in a yield of 88 percent (melting point 116–117° C). After recrystallizing from ligroin the product has a melting point of 118–119° C.

*Example 6*

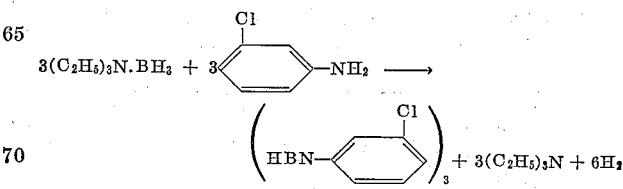

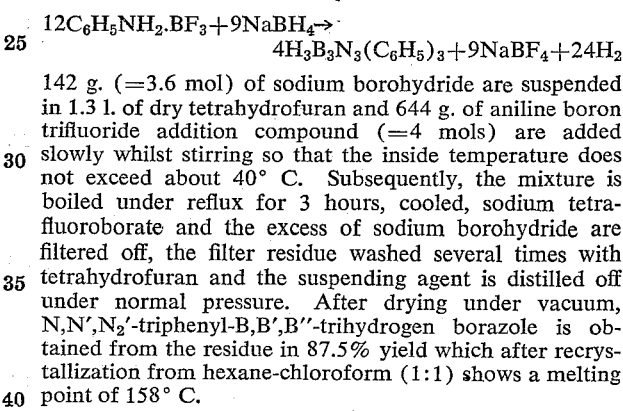

475 g. of white crystalline N,N',N''-tri-(3-chlorophenyl)-B,B',B''-trihydrogen-borazole, having a melting point of 105–106° C., corresponding to a yield of 86 percent of the theoretical are obtained from 460 g. (4 mols) of N- triethylborazane and 510 g. (4 mols) of trichloroaniline according to Example 5. . After recrystallizing from ligroin the product has a melting point of 107° C.

*Example 7*

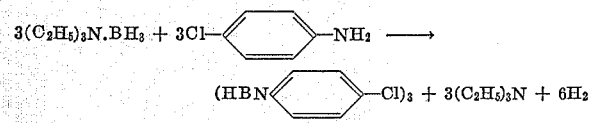

According to the procedures of Examples 5 and 6 the light grey colored crystalline N,N',N''-tri-(4-chlorophenyl)-B,B',B''-trihydrogenborazole of a melting point of 204–205° C. is obtained in a yield of 90 percent from 460 g. (4 mols) of N-triethylborazane and 510 g. (4 mols) of 4-chloroaniline by melting in a dropping funnel equipped with heating means and adding dropwise the melt of about 80° C. into the borazane heated to 100° C. After recrystallizing from benzene the substance has a melting point of 207° C.

*Example 8*

N,N',N''-tribenzyl-B,B',B''-trihydrogen-borazole which is identified by its infra-red spectrum is obtained in form of a wax-like substance of the melting point of 47° C. in substantially quantitative yield in a manner analogous to Examples 5 to 7 from 667 g. (5.8 mols) of N-triethylborazane and 621 g. (5.8 mols) of benzylamine.

*Example 9*

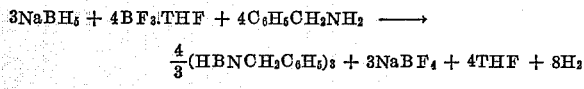

(THF=tetrahydrofuran)

125 g. (3.3 mols) of finely ground sodium borohydride are suspended in 3 litres of dry tetrahydrofuran, and 428 g. (4 mols) of benzylamine are added. 560 g. (4 mols) of borontrifluoride-tetrahydrofuran are added dropwise within about 30 minutes with stirring and gentle heating from outside in such a manner that with the evolution of hydrogen the reaction temperature rises to 45° C. The mixture is subsequently gently heated for another 2 hours to reflux, cooled, filtered, the filtration residue is thoroughly washed with dry THF and the solvent is distilled off at atmospheric pressure. The N,N',N''-tribenzyl-B,B',B''-trihydrogen-borazole which is identified by its infrared spectrum is obtained in a yield of about 80 percent in form of a white, wax-like substance which is taken up in hexane in order to remove any residue of sodium tetrafluoborate. After filtering once more the hexane is distilled off and the borazole is dried in vacuum. Melting point 45–46° C.

We claim:

1. A process of preparing N,N',N''-tricyclohexyl-B,B',B''-trihydrogen borazole which comprises heating a mixture of triethylamine borane and cyclohexylamine under anhydrous conditions, a molar ratio of 1:1, to a temperature of about 120° C. at which 2 mols of hydrogen are split off per mol of amine and recovering the N,N',N'' - tricyclohexyl - B,B',B'' - trihydrogenborazole thereby obtained from the reaction mixture.

2. A process of preparing N,N',N''-tridodecyl-B,B',B''-trihydrogenborazole which comprises heating a mixture of dodecylamine and triethylamine borane under anhydrous conditions, a molar ratio of 1:1, to a temperature of from 50–65° C. at which 2 mols of hydrogen are split off per mol of amine, and recovering the N,N',N''-tridodecyl-B,B',B''-trihydrogen-borazole thereby obtained from the reaction mixture.

3. A process of preparing N,N',N''-tri(n-propyl)-B,B',B''-trihydrogen borazole which comprises reacting sodium borohydride, n-propylamine and boron trifluoride-tetrahydrofuran under anhydrous conditions, a molar ratio of 1:1 (n-propylamine:boron trifluoride-tetrahydrofuran), to a temperature of about 50–65° C. and recovering the N,N',N''-tri(n-propyl)-B,B',B''-trihydrogen borazole thereby formed.

4. A process of preparing N,N',N''-triphenyl-B,B',B''-trihydrogen borazole which comprises reacting sodium borohydride and aniline boron trifluoride under anhydrous conditions to a temperature of about 40° C. at which 2 mols of hydrogen are split off per mol of amine, and isolating the borazole thereby formed from the resulting reaction mixture.

5. A process of preparing N,N',N''-tribenzyl-B,B',B''-trihydrogen borazole, which comprises reacting sodium borohydride benzylamine and borontrifluoride-tetrahydrofuran under anhydrous conditions, a molar ratio of 1:1 (benzylamine:boron trifluoride-tetrahydrofuran), to a temperature of about 45° C. at which 2 mols of hydrogen are split off per mol of amine, and isolating the borazole thereby formed from the reaction mixture.

References Cited by the Examiner

UNITED STATES PATENTS 2,978,502  4/1961  English et al. _____ 260—551
3,008,988  11/1961  Winternitz et al. _____ 260—551

FOREIGN PATENTS 857,176  12/1960  Great Britain.

OTHER REFERENCES

German Auslegeschrift 1,052,406, Mar. 12, 1959.
Schaeffer et al.: J. Am. Chem. Soc., vol. 71, pp. 2143–2145. (1949)

WALTER A. MODANCE, *Primary Examiner.*

JOHN D. RANDOLPH, *Examiner.*

H. I. MOATZ, *Assistant Examiner.*